United States Patent [19]

Mukaiyama et al.

[11] 3,867,453
[45] Feb. 18, 1975

[54] PRODUCTION OF KETONE BY REACTION OF ESTER OR THIOL ESTER WITH GRIGNARD REAGENT

[75] Inventors: Teruaki Mukaiyama; Masashi Araki, both of Tokyo; Hisashi Takei, Yokohama, all of Japan

[73] Assignee: Sumitomo Chemical Company, Limited, Osaka, Japan

[22] Filed: Mar. 11, 1974

[21] Appl. No.: 449,760

[52] U.S. Cl........ 260/570 AB, 260/570 R, 260/577, 260/578, 260/584 A, 260/586 R, 260/590, 260/591, 260/592, 260/593 R, 260/594, 260/327 M, 260/470 R, 260/471 C
[51] Int. Cl..................... C07c 87/48, C07c 87/36
[58] Field of Search....... 260/590, 591, 592, 327 M, 260/476 R, 471 C, 586 R, 584 A, 593 R, 570 AB, 570 R, 594, 577, 578

[56] References Cited
OTHER PUBLICATIONS
Kharasch et al., Grignard Reactions of Nonmetallic Substances, Pages 561–562 (1954).

*Primary Examiner*—Daniel D. Horwitz
*Attorney, Agent, or Firm*—Stevens, Davis, Miller & Mosher

[57] ABSTRACT

Ketones are produced by the reaction of an ester or a thiol ester with a Grignard reagent, optionally in an inert solvent at a temperature of preferably from −78° to +60°C.

5 Claims, No Drawings

PRODUCTION OF KETONE BY REACTION OF ESTER OR THIOL ESTER WITH GRIGNARD REAGENT

This invention relates to a process for producing ketones by the reaction of an ester or a thiol ester with a Grignard reagent.

It has been generally known that the reaction of Grignard reagents with carboxylic acid derivatives produces not only ketones but also tertiary alcohols. In order to increase the yields of ketones while suppressing those of tertiary alcohols, there have been proposed some processes for producing ketones by reacting carboxylic acid derivatives with Grignard reagents. For example, in the reaction of a halogenated acyl compound with a Grignard reagent, the yield of the ketone increased to some extent when the halogenated acyl compound was used in excess, but this process is not suitable for practical production (D. A. Shirley, *Org. Reactions*, 8, 28(1954)). In the reaction of a N-acylimidazole used instead of a halogenated acyl compound with a Grignard reagent, in which the reaction was carried out at a temperature of from −50°C to room temperature for 5 to 8 hours, the yield of the ketone varied from 5 to 94 percent. Thus this process is not suitable for commercial scale production (H. A. Staab and E. Jost, *Ann.* 655, 90(1962)). Although many other processes such as using an acid amide compound and a Grignard reagent, an acid anhydride and a Grignard reagent, etc., are proposed, the yields of the ketones are not suitable for commercial scale production. Recently, it is reported that the reaction of a 8-acyloxyquinoline with a Grignard reagent gives ketones (T. Sakan and Y. Mori, *Chem. Lett.*, 793(1972)). The reaction time required in said reaction is about 2.5 hours and the yields are 64 percent for acetophenone, 61 percent for propiophenone, 82 percent for benzophenone, etc. But in this process, it should be noted that the yields of ketones are not so high and further that 9 percent of triphenylcarbinol is by-produced in the case of the production of benzophenone.

As mentioned above, in the process for producing ketones by the reaction of a carboxylic acid derivative with a Grignard reagent, it is important to decrease the by-production of tertiary alcohols which are obtained by the undesired reaction of the ketones produced with the Grignard reagents and to increase the yields of the desired ketones. These problems have not been solved before the present application.

It has also been proposed to produce ketones by the reaction of a halogenated acyl compound with an organic cadmium compound which is used instead of a Grignard reagent, but this process is not suitable for commercial scale production since it has many disadvantages such as the yield of the ketone being not so high, the reactivity of the organic cadmium compound being so low as to by-produce almost no tertiary alcohol, stable cadmium compound having to be employed, and the like.

It is an object of the present invention to provide a process for producing ketones in high yield without by-producing tertiary alcohols. It is another object of the present invention to provide a process for producing ketones using a special ester or thiol ester as one of the starting materials. Further objects and advantages of this invention will be apparent to one skilled in the art from the accompanying disclosure and discussion.

The present invention provides a process for producing a ketone which comprises reacting a compound of the formula,

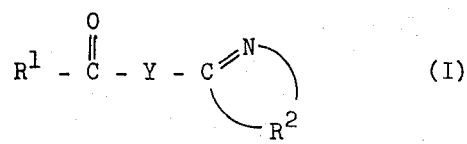

wherein $R^1$ is alkyl having 1–10 carbon atoms, cycloalkyl having 3–8 carbon atoms, alkenyl having 2–10 carbon atoms, alkynyl having 2–10 carbon atoms, phenyl, phenylalkyl having 7–10 carbon atoms and phenylalkenyl having 7–10 carbon atoms which may have at least one substituent such as alkyl having 1–4 carbon atoms, alkoxy having 1–4 carbon atoms, oxo, amino, substituted amino, halogen and so on, or a radical in which two or more of the above-mentioned radicals are bonded through —O—; $R^2$ is a hydrocarbon residue which can be heterocyclic rings together with the C and N atoms and which may contain one or more hetero atoms and particularly heterocyclic rings containing $R^2$ are preferably five-membered rings or six-membered rings which may have at least one substituent such as lower alkyl; and Y is oxygen or sulfur, with a Grignard reagent of the formula,

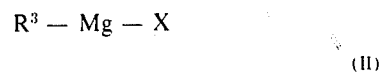

wherein $R^3$ is alkyl having 1–10 carbon atoms, cycloalkyl having 3–8 carbon atoms, alkenyl having 2–10 carbon atoms, or phenyl which may have at least one substituent such as alkyl having 1–4 carbon atoms, alkoxy having 1–4 carbon atoms, halogen and so on; and X is chlorine, bromine or iodine, bromine being preferable.

Specific examples of the heterocyclic radicals in the formula (I) are as follows:

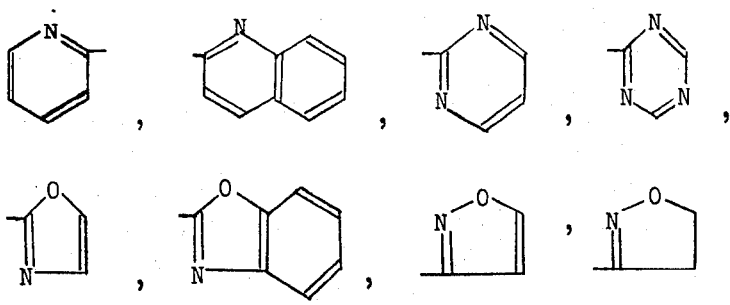

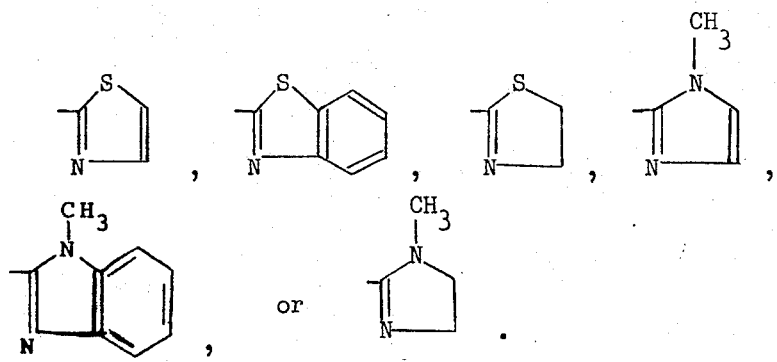

The following compounds are some specific examples of the compounds of the formula (I):
2-pyridyl acetate, 2-pyridyl propionate, 2-pyridyl benzoate; 2-pyridiyl-3-phenyl propionate, 3-pyridyl cinnamate, bis(2-pyridyl) adipate, 2-pyridyl[(5-ethoxycarbonyl)valerate], 2-pyridyl-6-oxoheptanoate, 2-pyridyl-4-oxovalerate ethylene dithioacetal, 2-oxazolyl benzoate, 2-oxabenzoxazolyl benzoate, 2-thiazolyl benzoate, 2-benzothiazolyl benzoate, 2-(N-methylimidazolyl) benzoate, 2-(N-methylbenzoimidazolyl) benzoate, 2-pyridylthiol acetate, 2-pyridylthiol propionate, 2-pyridylthiol benzoate, 2-pyridylthiol-3-phenyl propionate, 2-pyridylthiol cinnamate, bis(2-pyridylthiol) adipate, 2-pyridylthiol[(5-ethoxycarbonyl) valerate], 2-pyridylthiol-6-oxoheptanoate, 2-pyridylthiol-4-oxovalerate ethylene dithioacetal, 2-oxazolylthiol benzoate, 2-oxabenzolyl benzoate, 2-thiazolylthiol benzoate, 2-benzothiazolylthiol benzoate, 2-(N-methylimidazolylthiol) benzoate, 2-(N-methylbenzoimidazolylthiol) benzoate, etc.

As the Grignard reagent, the following compounds are some specific examples:
butylmagnesium bromide, hexylmagnesium bromide, hexenylmagnesium bromide, cyclohexylmagnesium bromide, phenylmagnesium bromide, etc.

The reaction can be carried out at lower temperatures, preferably from −78°C to +60°C.

Inert solvents such as diethyl ether, dibutyl ether, dimethoxyethane tetrahydrofuran, dioxane, tetrahydropyrans, benzene, toluene, xylene, chlorobenzenes and the like which do not react with the Grignard reagent can be used, if necessary. Particularly, tetrahydrofuran is most preferable.

The Grignard reagent can be used in equimolar to or in excess of the compound of the formula (I).

According to the process of this invention, the reaction can be completed in very short time. For example, when the reaction is carried out at 0°C, it can be completed immediately after the completion of the addition of a Grignard reagent.

After the reaction, the alcohol moiety of the ester or the thiol moiety of the thiol ester can be recovered and reused for the synthesis of an ester or thiol ester which is used as a starting material. Therefore, the present process is very advantageous for industrial production.

In carrying out the process of the present invention, various combinations of processes may be possible; e.g., synthesizing a Grignard reagent first and then reacting it with an ester or thiol ester, or synthesizing a Grignard reagent in the presence of an ester or thiol ester and then reacting the produced Grignard reagent immediately with the ester or thiol ester, etc.

When a thiol ester having an ethylenedithioacetal radical as a substituent in $R^1$ in the formula (I), for example, 2-pyridylthiol-4-oxovalerateethylenedithioacetal, is used as a starting material, the corresponding diketone can be obtained by hydrolyzing the ethylene dithioacetal moiety in the product obtained by the process of the present invention (K. Narasaka et. al, Bull. Chem. Soc. Japan 45, 3724 (1972)). The resulting diketone is a very important compound in chemical industries. For example, 1,4-diketone, which can be obtained as mentioned above, is a very important intermediate for synthesizing cyclopentenones or furanes. Thus the process of the present invention is very important and can widely be used in chemical industries.

According to the process of the present invention, ketones can be obtained in high yield without the by-production of tertiary alcohols. In addition, the reaction of the present invention can be applied to the commercial production of variously complicated ketones. Further, the reaction time is significantly short and the high reaction rate can be attained at lower temperature.

The invention is illustrated more particularly by way of the following examples but, as will be more apparent, is not limited to the details thereof.

In the following examples, the products are identified by means of infrared, NMR and elementary analyses, and the reactions are carried out under an atomosphere of argon before the completion of the addition of Grignard reagent. The yields are calculated based on the ester or thiol ester used.

EXAMPLE 1

To a solution of 0.199 g of 2-pyridyl benzoate in 10 cc of tetrahydrofuran, 1 cc of tetrahydrofuran containing an equimolar amount of phenylmagnesium bromide was added dropwise at 0°C with stirring. The reaction solution remained transparent. After the completion of the dropwise addition, about 0.2 cc of water was added to the reaction solution to precipitate white magnesium compound. After removing the solvent from the reaction solution by distillation, the residue was extracted with ethyl ether. The ether layer was washed with water, condensed and the product was separated by thin-layer chromatography using silica gel to obtain 0.169 g (93%) of benzophenone.

EXAMPLE 2

To a solution of 0.117 g of 2-pyridyl benzoate in 10 cc of tetrahydrofuran, 3 cc of tetrahydrofuran containing phenylmagnesium bromide in an amount of three times as much as the mole of 2-pyridyl benzoate was added dropwise at 0°C with stirring. The reaction mixture was treated as described in Example 1 and 0.091 g (85%) of benzophenone was obtained.

EXAMPLE 3

2-Pyridyl benzoate (0.199 g) was reacted with an equimolar amount of cyclohexylmagnesium bromide in ethyl ether as described in Example 1 to obtain 0.183 g (97%) of phenyl cyclohexyl ketone.

EXAMPLE 4

2-Pyridyl benzoate (0.199 g) was reacted with an equimolar amount of n-butylmagnesium bromide in tetrahydrofuran at 30°C as described in Example 1 to obtain 0.198 g (97%) of n-butyl phenyl ketone.

EXAMPLE 5

2-Pyridyl acetate (0.137 g) was reacted with an equimolar amount of phenylmagnesium bromide in tetrahydrofuran at 0°C as described in Example 1 to obtain 0.108 g (90%) of acetophenone.

EXAMPLE 6

2-Benzoxazolyl benzoate (0.239 g) was reacted with an equimolar amount of n-butylmagnesium bromide in tetrahydrofuran at 0°C as described in Example 1 to obtain 0.147 g (91%) of n-butyl phenyl ketone.

EXAMPLE 7

To a solution of 0.264 g of 2-pyridyl-3-phenyl propionate in 10 cc of tetrahydrofuran, tetrahydrofuran solution containing an equimolar amount of n-butylmagnesium bromide was added dropwise at 0°C with stirring. The reaction mixture was treated as described in Example 1 and 0.192 g (87%) of 1-phenyl-3-heptanone was obtained.

EXAMPLE 8

To a solution of 0.273 g of 2-pyridyl-3-phenyl propionate in 10 cc of tetrahydrofuran, tetrahydrofuran solution containing an equimolar amount of hexylmagnesium bromide was added dropwise at 0°C with stirring. The reaction mixture was treated as described in Example 1 and 0.228 g (88%) of 1-cyclohexyl-3-phenyl-1-propanone was obtained.

EXAMPLE 9

To a solution of 0.273 g of 2-pyridyl-3-phenyl propionate in 10 cc of tetrahydrofuran, tetrahydrofuran solution containing an equimolar amount of phenylmagnesium bromide was added at 0°C with stirring. The reaction mixture was treated as described in Example 1 and 0.225 g (88%) of 3-phenyl propiophenone was obtained.

EXAMPLE 10

To a solution of 0.254 g of 2-pyridyl-3-phenyl propionate in 10 cc of tetrahydrofuran, tetrahydrofuran solution containing an equimolar amount of tert-butylmagnesium bromide was added dropwise at 0°C with stirring. The reaction mixture was treated as described in Example 1 and 0.137 g (64%) of 1-phenyl-4,4-dimethyl-3-pentanone was obtained.

EXAMPLE 11

To a solution of 1.100 g of 2-pyridylthiol benzoate in 10 cc of benzene, 5 cc of tetrahydrofuran containing an equimolar amount of phenylmagnesium bromdie was added dropwise at 0°C with stirring. The reaction solution remained transparent. Addition of about 0.5 cc of water to the reaction solution colored it yellow and precipitated white precipitate. After removing the solvent from the reaction solution by distillation, the residue was extracted with chloroform, which was removed from the extract by distillation. After separating the product from the residue by silica gel column chromatography, 0.876 g (94%) of benzophenone was obtained.

EXAMPLE 12

To a solution of 0.831 g of 2-pyridylthiol-3-phenyl propionate in 15 cc of tetrahydrofurane, 4 cc of tetrahydrofuran containing an equimolar amount of n-bytylmagnesium bromide was added dropwise at 0°C with stirring. After the addition of about 0.5 cc of water to the reaction solution with stirring, the reaction mixture was treated as described in Example 11 to obtain 0.628 g (97%) of 1-phenyl-3-heptanone.

EXAMPLE 13

To a solution of 0.781 g of 2-pyridylthiol acetate in 20 cc of ethyl ether, 5 cc of ethyl ether containing an equimolar amount of phenylmagnesium bromide was added dropwise at the reflux temperature of ethyl ether with stirring. After the addition of about 0.5 cc of water, the reaction mixture was filtered. The filtrate was condensed and the product was separated by silica gel thin-layer chromatography to give 0.559 g (91%) of acetophenone.

EXAMPLE 14

2-Pyridylthiol-3-phenyl propionate (0.486 g) dissolved in 10 cc of tetrahydrofuran was reacted with an equimolar amount of cyclohexylmagnesium bromide using a procedure similar to that described in Example 11. The product was separated by silica gel thin-layer chromatography to give 0.411 g (95%) of 1-cyclohexyl-3-phenyl-1-propanone. The result of elementary analysis of this compound as the semicarbazone derivative was as follows: Calculated C: 70.29%, H: 8.48%, N: 15.37%; Found C: 70.41%, H: 8.48%, N: 15.42%. The melting point of this compound was 135°C.

EXAMPLE 15

2-Pyridylthiol-4-oxovalerate ethylene dithioacetal (2.274 g) dissolved in 15 cc of tetrahydrofuran was reacted with an equimolar amount of n-hexylmagnesium bromide dissolved in 15 cc of tetrahydrofuran which was added dropwise, using a procedure similar to that described in Example 11 to obtain 2.001 g (97%) of n-5-oxoundecane-2-ethylene dithioacetal.

EXAMPLE 16

2-Pyridylthiol-4-oxovalerate ethylene dithioacetal (1.194 g) dissolved in 10 cc of tetrahydrofuran was reacted with an equimolar amount of 3-cis-hexenylmagnesium bromide using a procedure similar to that described in Example 11 to obtain 1.001 g (93%) of n-5-oxo-8-cis-undecane-2-ethylene dithioacetal.

EXAMPLE 17

2-Pyridylthiol-3-phenyl propionate (0.362 g) was reacted with an equimolar amount of sec-butylmagnesium bromide in tetrahydrofuran using a procedure similar to that described in Example 11 to obtain 0.235 g (83%) of 1-phenyl-4-methyl-3-hexanone.

EXAMPLE 18

Bis(2-pyridylthiol) adipate (0.997 g) dissolved in 15 cc of tetrahydrofuran was reacted with phenylmagnesium bromide in an amount of two times as much as the mole of bis(2-pyridylthiol) adipate in tetrahydrofuran using a similar procedure to that described in Example 11 to obtain 0.375 g (92%) of 1,4-dibenzoylbutane. The result of elementary analysis of this product purified by recrystallization was as follows: Calculated C: 81.17%, H: 6.81%; Found C: 81.00%, H: 6.91%. The melting point of this compound was 107° – 107.5°C. Beside this compound, 0.625 g (94%) of 2-mercaptopyridine was recovered.

EXAMPLE 19

To a reactor containing 0.1 g of metallic magnesium, 0.215 g of 2-pyridylthiol benzoate, and 1 cc of tetrahydrofuran, a solution containing 0.204 g of iodobenzene and 1 cc of tetrahydrofuran was added dropwise gradually. The reaction mixture was treated as described in Example 11 to obtain 0.146 g (80%) of benzophenone.

EXAMPLE 20

2-Benzothiazolylthiol benzoate (0.814 g) was reacted with an equimolar amount of phenylmagnesium bromide in tetrahydrofuran using a procedure similar to that described in Example 11 to obtain 0.534 g (98%) of benzophenone. 2-Mercaptobenzothiazole was recovered quantitatively.

EXAMPLE 21

2-(N-Methylimidazolylthiol) benzoate (0.478 g) was reacted with an equimolar amount of phenylmagnesium bromide in tetrahydrofuran (15 cc) at 0°C using a procedure similar to that described in Example 11. After the reaction, about 0.2 cc of water was added thereto. The solvent was removed from the reaction solution by distillation and the residue was extracted with ethyl ether. The extract was washed with 1N aqueous solution of sodium hydroxide and water, and dried over anhydrous sodium sulfate. The ethyl ether was removed from the extract by distillation to give 0.399 g of white crystals of benzophenone quantitatively.

EXAMPLE 22

2-Pyridyl [(5-ethoxycarbonyl) valerate] (0.551 g) was reacted with an equimolar amount of phenylmagnesium bromide in tetrahydrofuran (15 cc) using a procedure similar to that described in Example 21. After treating the reaction solution as described in Example 21, the product of oily matter was separated by silica gel column chromatography to give 0.410 g (85%) of 4-(ethyoxycarbonyl)butyl phenyl ketone.

EXAMPLE 23

2-Pyridylthiol cinnamate (0.482 g) dissolved in 15 cc of tetrahydrofuran was reacted with an equimolar amount of phenylmagnesium bromide at −78°C while cooling with dry-ice. The reaction mixture was treated as described in Example 11 to obtain 0.369 g (89%) of chalcone.

EXAMPLE 24

2-Pyridylthiol-6-oxoheptanoate (0.470 g) dissolved in 10 cc of tetrahydrofuran was reacted with an equimolar amount of phenylmagnesium bromide at 0°C. The reaction mixture was treated as described in Example 11 to obtain 0.292 g (73%) of 1-phenyl-1,6-dioxoheptane.

EXAMPLE 25

N-Carbobenzoxy glycine (0.209 g) dissolved in tetrahydrofuran (10 cc) was reacted with triphenylphosphine (0.262 g) and 2,2′-dipyridyl disulfide to obtain 2-pyridylthiol ester of N-carbobenzoxy glycine. Then to the reaction mixture containing 2-pyridylthiol (N-carbobenzoxy)glycinate, tetrahydrofuran containing phenylmagnesium bromide in an amount of three times as much as the mole of 2-pyridylthiol (N-carbobenzoxy) glycinate at −78°C with stirring. The reaction mixture was treated as described in Example 11 to obtain 0.146 g (54%) of 2-(carbobenzoxyamino)acetophenone.

EXAMPLE 26

N-Carbobenzoxy alanine (0.223 g) dissolved in 10 cc of tetrahydrofuran was reacted with triphenylphosphine (0.262 g) and 2,2′-dipyridyl disulfide (0.220 g) to obtain the reaction mixture containing 2-pyridyl-(N-carbobenzoxy) alaninate and then the resulting reaction mixture was reacted with three times molar amount of phenylmagnesium bromide at −78°C. The reaction mixture was treated as described in Example 11 to obtain 0.191 g (68%) of 2-(carbobenzoxyamino)-propiophene.

What is claimed is:

1. A process for producing a ketone which comprises reacting at a temperature from −78° to +60°C in an inert solvent compound of the formula,

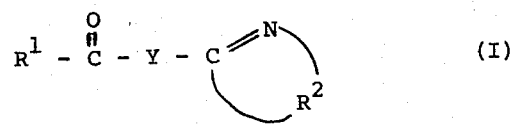

wherein $R^1$ is alkyl having 1 – 10 carbon atoms, cycloalkyl having 3 – 8 carbon atoms, alkenyl having 2 – 10 carbon atoms, alkynyl having 2 – 10 carbon atoms, phenyl, phenylalkyl having 7 – 10 carbon atoms or phenylalkenyl having 7 – 10 carbon atoms which may have at least one substitutent selected from the group consisting of alkyl having 1 – 4 carbon atoms, alkoxy having 1 – 4 carbon atoms, oxo, amino, substituted amino and halogen, or a radical in which two or more of the above-mentioned radicals are bonded through —O—; $R^2$ is a hydrocarbon residue which can form 5- or 6-membered heterocyclic ring together with the C and N atoms which may contain one or more hetero atoms and may be condensed with at least one benzene nucleus and further may contain at least one alkyl substituent; and Y is oxygen or sulfur, with a Grignard reagent of the formula, $$R^3 — Mg — X \qquad (II)$$

wherein $R^3$ is alkyl having 1–10 carbon atoms, cycloalkyl having 3–8 carbon atoms, alkenyl having 2–10 carbon atome, alkynyl having 2–10 carbon atoms, or phenyl which may have at least one substituent selected from the group consisting of alkyl having 1–4 carbon atoms, alkoxy having 1–4 carbon atoms and halogen; and X is chlorine, bromine or iodine, in an inert solvent.

2. A process according to claim 1, wherein the compound of the formula (I) is an ester of the formula,

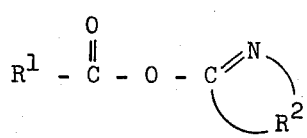

wherein $R^1$ and $R^2$ are as defined in Claim 1.

3. A process according to claim 1, wherein the compound of the formula (I) is thiol ester of the formula,

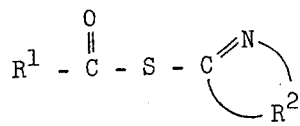

wherein $R^1$ and $R^2$ are as defined in Claim 1.

4. A process according to claim 1, wherein X is bromine.

5. A process according to claim 1, wherein the radical of the formula

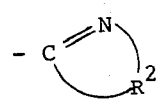

is a member selected from the group consisting of

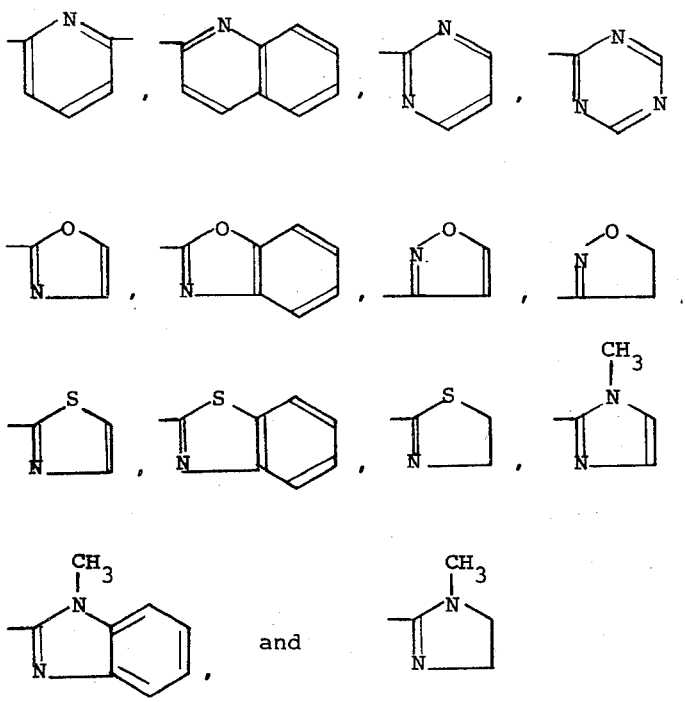

which may have at least one substituent of lower alkyl.

* * * * *

UNITED STATES PATENT OFFICE
CERTIFICATE OF CORRECTION

Patent No. 3,867,453  Dated February 18, 1975

Inventor(s) Teruaki MUKAIYAMA et al

It is certified that error appears in the above-identified patent and that said Letters Patent are hereby corrected as shown below:

Reference to the Japanese priority applications is missing and should be inserted as follows:

-- Japan, Appln. No. 29270/73 filed March 12, 1973 and
   Japan, Appln. No. 93679/73 filed August 20, 1973. --

Column 2, line 48, the words --alkynyl having 2-10 carbon atoms-- are missing after the word "atoms,".

Column 3, the next to the last formula at the top of the column should read as follows:

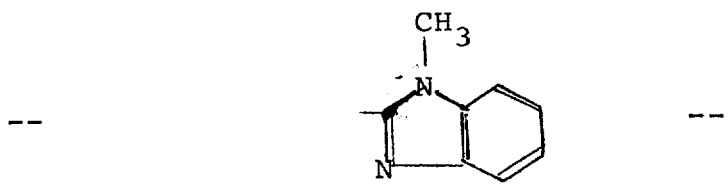

Column 3, line 19, "3-pyridyl cinna-" should read --2-pyridyl cinna- --.

Column 8, line 6, (last line of Example 26) "propiophene" should read --propiophenone--.

Signed and Sealed this second Day of September 1975

[SEAL]

Attest:

RUTH C. MASON  
*Attesting Officer*

C. MARSHALL DANN  
*Commissioner of Patents and Trademarks*